US006569976B2

(12) United States Patent
Baxter et al.

(10) Patent No.: US 6,569,976 B2
(45) Date of Patent: May 27, 2003

(54) AMPHIPHILIC POLYMER COMPOSITION

(75) Inventors: Steven Michael Baxter, Chalfont, PA (US); Thomas Cleveland Kirk, Ivyland, PA (US); Curtis Schwartz, Ambler, PA (US); Barry Weinstein, Dresher, PA (US)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 09/846,130

(22) Filed: May 1, 2001

(65) Prior Publication Data

US 2002/0010296 A1 Jan. 24, 2002

Related U.S. Application Data

(60) Provisional application No. 60/207,912, filed on May 30, 2000.

(51) Int. Cl.[7] .............................................. C08J 220/46
(52) U.S. Cl. ................. 526/317.1; 526/210; 526/318.2; 526/318.3; 526/318.41; 526/225; 526/229; 526/932
(58) Field of Search .............................. 526/210, 318.2, 526/318.3, 318.41, 932, 225, 229, 317.1

(56) References Cited

U.S. PATENT DOCUMENTS 3,894,980 A * 7/1975 DeTommaso ............... 524/558
4,138,381 A * 2/1979 Chang et al. ............... 524/765
4,384,096 A   5/1983 Sonnabend
4,797,223 A   1/1989 Amick et al.

FOREIGN PATENT DOCUMENTS

| EP | 3235 | 8/1979 |
| EP | 995791 | 4/2000 |
| JP | 7-216388 | 8/1995 |

* cited by examiner

Primary Examiner—Tatyana Zalukaeva
(74) Attorney, Agent, or Firm—Thomas J. Howell; Stephen E. Johnson

(57) ABSTRACT

Polymer compositions derived from selected monoethylenically unsaturated ($C_3$–$C_6$)carboxylic acid monomers, ($C_1$–$C_4$)alkyl (meth)acrylate ester monomers and alkoxylated (meth)acrylate monomers used in certain weight ratios to provide enhanced detergent and cleaning performance are disclosed. Polymer compositions containing from 5 to 40% of monoethylenically unsaturated ($C_3$–$C_6$)carboxylic acid monomer, from 35 to 65% of ($C_1$–$C_4$)alkyl (meth)acrylate ester monomer and from 20 to 60% of alkoxylated (meth) acrylate monomer provide improved cleaning performance in laundry detergent formulations relative to conventional polymer compositions.

10 Claims, No Drawings

AMPHIPHILIC POLYMER COMPOSITION

CROSS REFERENCE TO RELATED PATENT APPLICATIONS

This is a non-provisional application of prior pending U.S. provisional application Ser. No. 60/207,912 filed May 30, 2000.

BACKGROUND

The present invention relates to polymer compositions containing both hydrophobic and hydrophilic moieties. Polymer compositions of the present invention are useful as active ingredients in detergent and cleaning formulations; in particular, the polymer compositions of the present invention are useful in laundry detergent formulations.

In the absence of suitable dispersants, oily soil particles that are removed during the washing step of typical laundry processes may re-deposit onto the fabric being cleaned. Additives are used during the washing process to disperse and suspend the soil particles in the wash liquor so that the soil particles may be removed during the rinse portion of the cleaning process. Materials used to disperse and suspend soil particles in cleaning formulations must be compatible with other components of the cleaning formulation as well as provide satisfactory dispersing and suspending properties towards oil soil particles. Accordingly, there is a need for materials that can be used as compatible, effective oily soil dispersants in laundry detergent formulations.

A variety of copolymer compositions have been used as additives in cleaning formulations. For example, JP 7-216388 discloses detergent compositions for cleaning hard surfaces, in particular metal parts, where the components of the detergent composition are (1) copolymers of 1 to 50% acrylic or methacrylic acid monomer units and 50 to 99% of (meth)acrylic acid derivative monomer units, such as ($C_1$–$C_4$)alkyl (meth)acrylates and methoxy(meth)acrylate poly(ethyleneglycol) adducts; and (2) an anionic surfactant.

U.S. Pat. No. 4,384,096 discloses emulsion polymers containing 15 to 60% of ($C_3$–$C_8$) ethylenically unsaturated carboxylic acid monomer units, 15 to 80% of nonionic copolymerizable ($C_2$–$C_{12}$) ethylenically unsaturated monomer units, and 1 to 30% of certain vinyl surfactant esters, including ($C_8$–$C_{20}$)alkoxy(meth)acrylate poly(alkyleneglycol) and ($C_8$–$C_{16}$)alkylphenoxy(meth)acrylate poly(alkyleneglycol) adducts; these emulsion polymers are disclosed as being useful as thickeners in cosmetic products, drilling muds, and aqueous coating compositions, such as latex paint.

U.S. Pat. No. 4,797,223 discloses detergent compositions containing water-soluble polymers as builders, dispersants and anti-redeposition agents. The water-soluble polymers disclosed include those containing 20 to 95% of ethylenically unsaturated ($C_3$–$C_6$)monocarboxylic acid monomer units; 4 to 80% of (meth)acrylate esters of poly(alkyleneoxides), including ($C_1$–$C_{18}$)alkoxy(meth)acrylate poly(alky-lene glycol) and ($C_1$–$C_{18}$)alkaryloxy(meth)acrylate poly(alkyleneglycol) adducts; and 0 to 30% of noncarboxylate ethylenically unsaturated monomer units such as ethyl acrylate or methyl methacrylate.

European Patent Application EP 995,791 discloses hydrophobically-modified polycarboxylate polymers for promoting soil release from fabrics, where the polymers contain monomeric units of a first monomer selected from alkyl (meth)acrylates, ethoxylated alkyl (meth)acrylates and poly(alkylene glycol) (meth)acrylates and at least one of a second monomer selected from unsaturated ($C_3$–$C_8$) carboxylic acids and/or other unsaturated monomers copolymerizable with the other monomers.

The present invention seeks to improve upon the prior detergent dispersant technology by identifying polymers that are compatible in the cleaning formulation and that provide enhanced cleaning and anti-redeposition properties when used in laundry detergent formulations.

SUMMARY OF INVENTION

The present invention provides a polymer comprising, as polymerized units: (a) 5 to 40 percent, based on weight of the polymer, of a monoethylenically unsaturated ($C_3$–$C_6$) carboxylic acid; (b) 35 to 65 percent, based on weight of the polymer, of a ($C_1$–$C_4$)alkyl (meth)acrylate ester; and (c) 20 to 60 percent, based on weight of the polymer, of an alkoxylated (meth)acrylate monomer having formula I:

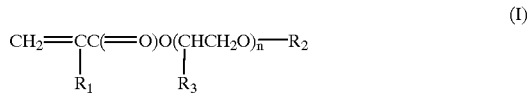

wherein:

n is from 2 to 30;

$R_1$ is H or $CH_3$;

$R_2$ is H or a ($C_1$–$C_6$)alkyl group; and $R_3$ is H or $CH_3$.

In another embodiment, the present invention provides a polymer comprising, as polymerized units: 10 to 30 percent of acrylic acid, 40 to 60 percent of butyl acrylate, and 30 to 50 percent of the alkoxylated (meth)acrylate monomer having formula I, wherein $R_1$ and $R_2$ are $CH_3$, $R_3$ is H, and n is from 4 to 9.

DETAILED DESCRIPTION

We have discovered that polymer compositions based on selected alkyl (meth)acrylate ester monomers, carboxylic acid monomers and alkoxylated (meth)acrylate monomers, formed in selected weight ratios, can be designed to incorporate the beneficial hydrophilic and hydrophobic characteristics of each type of monomer, resulting in unexpectedly improved cleaning properties of fabric cleaning formulations containing the polymers, in particular liquid and solid laundry detergent formulations.

As used herein, the following terms have the designated definitions, unless the context clearly indicates otherwise. The term "alkyl (meth)acrylate" refers to either the corresponding acrylate or methacrylate ester; similarly, the term "(meth)acrylic" refers to either acrylic or methacrylic acid and the corresponding derivatives, such as esters or amides. All percentages referred to will be expressed in weight percent (%), based on total weight of polymer or composition involved, unless specified otherwise. The term "copolymer" refers to polymer compositions containing units of two or more different monomers. The following abbreviations are used herein: g=grams; ppm=parts per million by weight/volume. Unless otherwise specified, ranges listed are to be read as inclusive and combinable and temperatures are in degrees centigrade (° C.).

Polymers of the present invention typically have a weight average molecular weight ($M_w$) for the backbone polymer of 1,000 to 100,000, preferably from 2,000 to 50,000 and more preferably from 3,000 to 20,000. Weight average molecular weights for the backbone polymer are based on aqueous phase gel permeation chromatography (GPC) analysis using known polymer standards appropriate for the polymer compositions involved; the polymers are subjected to hydrolysis (to the acid form) prior for determination of the backbone polymer molecular weight.

The polymers of the present invention contain, as polymerized units, from 5 to 40%, preferably from 10 to 30% and more preferably from 10 to 20%, of one or more monoethylenically unsaturated ($C_3$–$C_6$)carboxylic acid monomers. Suitable monoethylenically unsaturated ($C_3$–$C_6$) carboxylic acid monomers include monoethylenically unsaturated monocarboxylic acids and monoethylenically unsaturated dicarboxylic acid monomers. For example, monoethylenically unsaturated monocarboxylic acids include acrylic acid (AA), methacrylic acid (MAA), α-ethacrylic acid, β,β-dimethylacrylic acid, vinylacetic acid, allylacetic acid, ethylidineacetic acid, propylidineacetic acid, crotonic acid, and alkali and metal salts thereof. Suitable monoethylenically unsaturated dicarboxylic acid monomers include, for example, maleic acid, maleic anhydride, fumaric acid, itaconic acid, citraconic acid, mesaconic acid, methylenemalonic acid, and alkali and metal salts thereof. Preferably, the monoethylenically unsaturated ($C_3$–$C_6$)carboxylic acid monomers are selected from one or more of acrylic acid and methacrylic acid.

The polymers of the present invention contain, as polymerized units, from 35 to 65%, preferably from 40 to 60% and more preferably from 40 to 50%, of one or more ($C_1$–$C_4$)alkyl (meth)acrylate ester monomers. Suitable ($C_1$–$C_4$)alkyl (meth)acrylate ester monomers include, for example, methyl acrylate, ethyl acrylate, propyl acrylate, isopropyl acrylate, butyl acrylate, isobutyl acrylate, secondary butyl acrylate, tertiary-butyl acrylate, methyl methacrylate, ethyl methacrylate, propyl methacrylate, isopropyl methacrylate, butyl methacrylate and isobutyl methacrylate. Preferred (meth)acrylate esters include methyl acrylate, ethyl acrylate and butyl acrylate.

The polymers of the present invention contain, as polymerized units, from 20 to 60%, preferably from 25 to 55%, more preferably from 30 to 50% and most preferably from 35 to 45%, of an alkoxylated (meth)acrylate monomer having formula I. Suitable alkoxylated (meth)acrylate monomers include, for example, those of formula I wherein $R_1$ is H or $CH_3$; n is from 2 to 30, preferably from 4 to 20 and more preferably from 4 to 9; $R_2$ is H or a ($C_1$–$C_6$)alkyl group, preferably a ($C_1$–$C_3$)alkyl group and more preferably a methyl group; and $R_3$ is H or $CH_3$.

Polymers of the present invention may optionally contain, as polymerized units, from zero to 10%, and preferably from zero to 5%, of one or more vinyl or vinylidene monoaromatic monomers. Suitable vinyl or vinylidene monoaromatic monomers include, for example, styrene, and styrene that is substituted on the aromatic ring with one or more ($C_1$–$C_4$)alkyl radicals, hydroxyl radicals, chlorine atoms or bromine atoms. When present, the vinyl or vinylidene monoaromatic monomer is preferably styrene, α-methyl styrene or chlorostyrene.

Polymers of the present invention may optionally contain, as polymerized units, from zero to 10%, and preferably from zero to 5%, of one or more other copolymerizable monomers. Suitable other copolymerizable monomers include, for example, butadiene, acrylonitrile, ethylene, vinyl acetate, hydroxyalkyl (meth)acrylates, ($C_5$–$C_{20}$)alkyl (meth) acrylates, poly(alkyleneoxide) di(meth)acrylates, amides of ethylenically unsaturated ($C_3$–$C_6$)carboxylic acids, amides of ethylenically unsaturated ($C_3$–$C_6$)carboxylic acids that are substituted at the nitrogen by one or two ($C_1$–$C_4$)alkyl groups, acrylamide, methacrylamide, N-methylol (meth) acrylamide, quaternary ammonium salts of acrylamide, (3-acrylamidopropyl)trimethylammonium chloride, (3-methacrylamidopropyl)trimethylammonium chloride, quaternary ammonium salts of (meth)acrylate esters (such as 2-(N,N,N-trimethylammonium)ethyl (meth)acrylate), 2-(dimethylamino)ethyl (meth)acrylate, N,N-dimethyl-N-methylacryloxyethyl-N-(3-sulfopropyl)-ammonium betaine and N,N-dimethyl-N-acrylamidopropyl-N-(3-sulfopropyl)-ammonium betaine. Additional suitable copolymerizable monomers include, for example, 2-acrylamido-2-methyl-1-propanesulfonic acid, 2-methacrylamido-2-methyl-1-propanesulfonic acid, 3-methacrylamido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy) propanesulfonic acid, 2-methyl-2-propene-1-sulfonic acid, styrene sulfonic acid, vinylsulfonic acid, 3-sulfopropyl acrylate, 3-sulfopropyl methacrylate, sulfomethyl acrylamide and sulfomethyl methacrylamide.

Increased levels of long chain alkyl hydrophobe in the polymer, for example, greater than about 10% based on total weight of the polymer, such as ($C_8$–$C_{20}$)alkyl (meth)acrylate monomers (for example lauryl methacrylate) or ($C_8$–$C_{20}$) alkoxy(meth)acrylate poly(alkyleneglycol) adducts, are generally undesirable because of color bodies typically introduced into the polymer using these monomers and/or decreased solubility of the resultant polymers under alkaline end-use conditions.

Preferably the polymers of the present invention are substantially free of monomeric units other than the aforementioned monoethylenically unsaturated ($C_3$–$C_6$) carboxylic acids, ($C_1$–$C_4$)alkyl (meth)acrylate esters and alkoxylated (meth)acrylate monomers of formula I; that is, the polymers contain zero or less than 5%, preferably zero or up to 2%, and more preferably zero or up to 1%, of optional monomer units, based on weight of the polymer.

The polymers of the present invention may be made using known techniques, for example, solution (aqueous or solvent), emulsion, solvent-exchange (solution polymerization followed by phase inversion) or suspension polymerization; the polymerizations can be conducted as cofeed, heel, semi-continuous or continuous processes. The polymers may be random or block polymers depending upon the specific method used to conduct the polymerization. The polymers may be used in solution form, for example as aqueous solutions, or they may be isolated as solid materials, for example by spray drying, and used in the form of granules or particulates.

When the polymers of this invention are prepared by solution polymerization, the selected monomers are mixed in the presence of a polymerization initiator, a diluent and optionally a chain transfer agent. The reaction can be run under agitation in an inert atmosphere at a temperature of from about 60 to 140° C. and more preferably from 85 to 105° C. The reaction is run generally for about 4 to 10 hours or until the desired degree of polymerization has been reached. When the polymerization is run as a cofeed process, initiator and the monomers are typically introduced into the reaction mixture as separate feed streams that are added linearly over time, that is, at constant rates. Generally, the feeds are conducted for periods of time from 5 minutes to 5 hours, preferably from 30 minutes to 4 hours, and most preferably from 1 hour to 3 hours. As is recognized by those skilled in the art, the time and temperature of the reaction are dependent on the choice of initiator and can be varied accordingly.

Initiators useful for these polymerizations are any of the well known free-radical-producing compounds such as peroxy, hydroperoxy and azo initiators, including for example, acetyl peroxide, benzoyl peroxide, lauroyl peroxide, t-butyl peroxyisobutyrate, caproyl peroxide, cumene hydroperoxide, 1,1-di(t-butyl-peroxy)-3,3,5-trimethylcyclohexane, azobisisobutyronitrile, t-butyl peroxypivalate and t-butyl peroctoate. The initiator concentration is normally between 0.1 and 6% by weight based on the total weight of the monomers and more preferably from 0.5 to 4%. Chain transfer agents may also be added to the polymerization reaction to control the molecular weight of the polymer. The preferred chain transfer agents are alkyl mercaptans such as lauryl (dodecyl) mercaptan, and the concentration of chain transfer agent used is from 0 to about 0.5% by weight.

Water-soluble redox initiators may also be used. Redox initiators include, for example, sodium bisulfite, sodium sulfite, hypophosphites, phosphites, isoascorbic acid, sodium formaldehyde-sulfoxylate and hydroxylamines, used in conjunction with suitable oxidizing agents, such as the thermal free-radical initiators noted above. The redox initiators are typically used in amounts from 0.05 to 10%, preferably from 0.5 to 5%, based on the weight of total monomer. Combinations of initiators can also be used.

Polymerization processes for the preparation of polymers of the present invention generally result in good conversion of the monomers into polymer product. However, if residual monomer levels in the polymer mixture are undesirably high for a particular application, their levels can be reduced by any of several techniques. One common method for reducing the level of residual monomer in a polymer mixture is the post-polymerization addition of one or more initiators or reducing agents to assist scavenging of unreacted monomer.

Preferably, any post-polymerization additions of initiators or reducing agents are conducted at or below the polymerization temperature. The initiators and reducing agents suitable for reducing the residual monomer content are well known to those skilled in the art. Generally, any of the initiators suitable for the polymerization are also suitable for reducing the residual monomer content of the polymer mixture. The level of initiators or reducing agents added as a means for reducing the residual monomer content should be as low as possible to minimize contamination of the product. Generally, the level of initiator or reducing agent added to reduce the residual monomer content is in the range from 0.1 to 2.0 mole %, preferably from 0.5 to 1.0 mole %, based on the total amount (moles) of polymerizable monomer.

U.S. Pat. No. 3,037,952 may be consulted for further general and specific details on methods to prepare polymers of the present invention via emulsion polymerization. U.S. Pat. No. 4,230,844 may be consulted for further general and specific details on methods to prepare polymers of the present invention via solution (solvent) polymerization. Further general and specific details on preparation of polymers of the present invention by solution polymerization followed by phase inversion may be found in *Progress in Organic Coatings*, 29, p 211 (1996) and *Progress in Organic Coatings*, 26, p 207 (1995).

Some embodiments of the invention are described in detail in the following Examples; unless otherwise specified, all ratios, parts and percentages (%) are expressed by weight and all reagents used are of good commercial quality. Abbreviations used in the Examples and Tables are listed below:

| | |
|---|---|
| BA | = butyl acrylate |
| AA | = acrylic acid |
| MAA | = methacrylic acid |
| LMA | = lauryl methacrylate |
| PEGMMA(200)[a] | = poly(ethylene glycol-200) methyl ether methacrylate |
| PEGMMA(400)[b] | = poly(ethylene glycol-400) methyl ether methacrylate |
| PEGMMA(1000)[c] | = poly(ethylene glycol-1000) methyl ether methacrylate |

[a]200 is approximate molecular weight of poly(ethyleneglycol) portion, corresponding to n = 4 in formula I with $R_2 = R_1$ = methyl, $R_3$ = H.
[b]400 is approximate molecular weight of poly(ethyleneglycol) portion, corresponding to n = 8 – 9 in formula I with $R_2 = R_1$ = methyl, $R_3$ = H.
[c]1000 is approximate molecular weight of poly(ethyleneglycol) portion, corresponding to n = 20 – 22 in formula I with $R_2 = R_1$ = methyl, $R_3$ = H.

EXAMPLE 1

A monomer mixture was prepared by combining 128 g glacial AA, 479 g butyl acrylate and 393 g PEGMMA(400). A separate initiator feed solution was prepared consisting of 40 g of a 75% solution of t-butyl peroxypivalate in petroleum ether. To a 3-liter, 4-necked flask equipped with mechanical stirrer, a reflux condenser topped with nitrogen inlet, feed inlet ports, and a thermocouple, was added 530 g propylene glycol. After the reactor contents were heated to 82° C., the monomer mixture and the initiator solution were each added separately to the reactor over a period of 3 hours at uniform rate while maintaining the temperature at 82° C. Upon completion of addition of the monomer and initiator feed solutions, the reaction mixture was maintained at 82° C. for an additional hour; about one-third of the way through the one-hour hold, an additional 2 g of a 75% solution of t-butyl peroxypivalate in petroleum ether was added to the reaction mixture, followed by a second 2 g addition about two thirds of the way through the one-hour hold. The reaction mixture was then cooled to ambient temperature to produce a final solution that contained approximately 63% polymer solids, by weight, in propylene glycol. Polymer samples identified as 1-1, 1-2 and 1-3 represent three different polymers prepared as described above.

EXAMPLES 2–9

In a manner similar to that described in Example 1, polymers of varying monomeric composition, representing polymers of the present invention, were prepared: see Table I.

EXAMPLES 10C–18C

In a manner similar to that described in Example 1, polymers of varying monomeric composition, representing comparative polymer compositions, were prepared: see Table I.

TABLE I

Polymer Compositions

| Polymer # | AA | BA | PEGMMA | $M_w$ (backbone) |
|---|---|---|---|---|
| 1-1 | 13 | 48 | 39 (400) | 13,500 |
| 1-2 | 13 | 48 | 39 (400) | 13,500 |
| 1-3 | 13 | 48 | 39 (400) | 5,300 |
| 2 | 13 | 48 | 39 (1000) | 8,300 |
| 3 | 18 | 41 | 41 (400) | 7,000 |
| 4 | 24 | 45 | 31 (200) | 13,000 |
| 5 | 21 | 49 | 30 (200) | 13,000 |
| 6 | 15 | 56 | 29 (200) | 12,400 |

TABLE I-continued

Polymer Compositions

| Polymer # | AA | BA | PEGMMA | $M_w$ (backbone) |
|---|---|---|---|---|
| 7 | 32 | 40 | 28 (400) | 9,400 |
| 8 | 16 | 58 | 26 (400) | 11,500 |
| 9 | 16 | 61 | 23 (200) | 6,300 |
| 10C | 51 | 0 | 49 (400) | 3,400 |
| 11C | 33 | 23 | 44 (400) | 3,400 |
| 12C | 45 | 35 | 20 (200) | 28,100 |
| 13C | 36 | 45 | 19 (200) | 10,600 |
| 14C | 24 | 58 | 18 (200) | 13,400 |
| 15C | 29 | 53 | 18 (200) | 9,300 |
| 16C | 12 (MAA) | 51 + 13 LMA | 24 (400) | 5,100 |
| 17C | 8 (MAA) | 55 + 13 LMA | 24 (400) | 4,700 |
| 18C | 4 | 21 + 59 MA | 16 (400) | — |

EXAMPLE 19

The polymers of the present invention were evaluated for cleaning efficacy using a multi-cycle whiteness test protocol, using a miniature version of a top-loading U.S. style washing machine that possesses a wash, rinse and spin cycle, and has a wash-bath liquid capacity of about 2 gallons (=7.6 liters) of water. This test measures, and is predictive of, the ability of the active polymer to suspend added clay/oil-based soil and to prevent the soil from depositing on the fabric (subsequently affecting its whiteness over multiple wash cycles).

Fabric swatch test fabrics used for the whiteness testing were made from polyester/cotton, polyester, and cotton that were artificially soiled with body soil. The whiteness test involves washing these fabrics in an aqueous matrix containing a phosphate detergent (1250 ppm), added calcium and magnesium ions (25 grains (=1.6 grams) per gallon), 20 ppm of polymer active ingredient, and an added clay/oil-based soil. The washing test was repeated several times.

After several cleaning cycles, the test fabric swatches were evaluated against each other by graders and an average "whiteness" or "cleaning efficiency" rating was assigned to each polymer evaluated based on an average of the results for each of the fabrics tested: a rating of "zero" (0) was considered "white" or very clean; some slight coloration or greying (due to the soiling) was "1", and progressively increased degrees of soiling were designated as "2" or "3" or "4" ratings. A relative cleaning efficiency rating of "4" represented significant soiling (that is, very poor cleaning efficiency) under these conditions.

For the purposes of the present invention, satisfactory cleaning performance for a polymer was characterized by a relative cleaning efficiency rating of zero (0) to about 2. Preferably, the enhanced cleaning performance of the polymers of the present invention were characterized by cleaning efficiency ratings from zero to about 1.5, and more preferably from zero to about 1.

Table II presents a summary of the cleaning performance of the polymers of the present invention. Polymers with the suffix "C" represent comparative examples and are not polymers of the present invention (#10C–18C); polymers of the present invention are represented by #1–9; in addition, a commercial poly(acrylic acid) polymer is included in Table II to illustrate the enhanced cleaning efficiency of polymers of the present invention relative to the poor cleaning performance (significant soiling) of this poly(acrylic acid) polymer.

Polymer 10C represents a polymer having an unsaturated ($C_3$–$C_6$)carboxylic acid level (above 40%) and ($C_1$–$C_4$)alkyl (meth)acrylate ester level (less than 35%) outside of the ranges required for the polymers of present invention: the cleaning efficiency of this polymer is correspondingly poor. Polymer 11C represents a polymer having a ($C_1$–$C_4$)alkyl (meth)acrylate ester level (less than 35%) outside of the range required for the polymers of present invention. Polymer 12C represents a polymer having the unsaturated ($C_3$–$C_6$)carboxylic acid level (above 40%) outside of the range required for the polymers of present invention: the cleaning efficiency of this polymer is correspondingly poor. Polymers 13C, 14C and 15C represent polymers having the alkoxylated (meth)acrylate monomer levels (less than 20%) outside of the range required for the polymers of present invention: the cleaning efficiencies of these polymers are correspondingly poor. Polymers 16C and 17C represent polymers having a significant amount of long chain alkyl (meth)acrylate ester (lauryl=($C_{12}$)alkyl) in addition to the ($C_1$–$C_4$)alkyl (meth)acrylate ester component representative of the polymers of present invention: the cleaning efficiencies of these polymers are correspondingly poor. Polymer 18C represents a polymer having an unsaturated ($C_3$–$C_6$) carboxylic acid level (less than 10%) and alkoxylated (meth) acrylate monomer level (less than 20%) outside of the ranges required for the polymers of present invention.

TABLE II

Polymer Cleaning Efficiency

| Polymer # | AA | BA | PEGMMA | Cleaning Efficiency Rating (**) |
|---|---|---|---|---|
| 1-1 | 13 | 48 | 39 (400) | 0 |
| 1-2 | 13 | 48 | 39 (400) | 0 |
| 1-3 | 13 | 48 | 39 (400) | 0 |
| 2 | 13 | 48 | 39 (1000) | 0.5–1 (2) |
| 3 | 18 | 41 | 41 (400) | 0.5 |
| 4 | 24 | 45 | 31 (200) | 1.5–2 (2) |
| 5 | 21 | 49 | 30 (200) | 0.5–1.5 (4) |
| 6 | 15 | 56 | 29 (200) | 1 (2) |
| 7 | 32 | 40 | 28 (400) | 2–3 (2) |
| 8 | 16 | 58 | 26 (400) | 1 (2) |
| 9 | 16 | 61 | 23 (200) | 1.5 |
| 10C | 51 | 0 | 49 (400) | 4 |
| 11C | 33 | 23 | 44 (400) | 2 |
| 12C | 45 | 35 | 20 (200) | 3 |
| 13C | 36 | 45 | 19 (200) | 3 |
| 14C | 24 | 58 | 18 (200) | 3 |
| 15C | 29 | 53 | 18 (200) | 3 |
| 16C | 12 (MAA) | 51 + 13 LMA | 24 (400) | 2.5 |
| 17C | 8 (MAA) | 55 + 13 LMA | 24 (400) | 3.5 |
| 18C | 4 | 21 + 59 MA | 16 (400) | 2 |
| Poly(AA)* | 100 | 0 | 0 | 3.5 |

*commercially available dispersant polymer having $M_w$ of approximately 5000
**range of cleaning values based on number () of different sample evaluations

We claim:

1. A polymer comprising, as polymerized units:
   (d) 5 to 40 percent, based on the weight of the polymer, of a monoethylenically unsaturated ($C_3$–$C_6$)carboxylic acid;
   (e) 35 to 65 percent, based on the weight of the polymer, of a ($C_1$–$C_4$)alkyl (meth)acrylate ester; and
   (f) 20 to 60 percent, based on the weight of the polymer, of an alkoxylated (meth)acrylate monomer having formula I:

$$CH_2=C(R_1)C(=O)O[CH(R_3)CH_2O]_n-R_2 \qquad (I)$$

wherein: n is from 2 to 30; $R_1$ is H or $CH_3$; $R_2$ is H or a ($C_1$–$C_6$)alkyl group; $R_3$ is H or $CH_3$; and wherein a chain transfer agent is used to control molecular weight of the polymer such that polymer backbone weight average molecular weight is from 3000 to 20,000.

2. The polymer composition of claim 1 wherein the monoethylenically unsaturated ($C_3$–$C_6$)carboxylic acid is selected from one or more of acrylic acid, methacrylic acid, maleic acid and itaconic acid.

3. The polymer composition of claim 2 wherein the monoethylenically unsaturated ($C_3$–$C_6$)carboxylic acid is selected from one or more of acrylic acid and methacrylic acid.

4. The polymer composition of claim 1 comprising from 10 to 30 percent of the monoethylenically unsaturated ($C_3$–$C_6$)carboxylic acid.

5. The polymer composition of claim 1 wherein the ($C_1$–$C_4$)alkyl (meth)acrylate ester is selected from one or more of methyl acrylate, methyl methacrylate, ethyl acrylate, ethyl methacrylate, propyl acrylate, propyl methacrylate, butyl acrylate and butyl methacrylate.

6. The polymer composition of claim 5 wherein the ($C_1$–$C_4$)alkyl (meth)acrylate ester is selected from one or more of methyl acrylate, ethyl acrylate and butyl acrylate.

7. The polymer composition of claim 1 comprising from 40 to 60 percent of the ($C_1$–$C_4$)alkyl (meth)acrylate ester.

8. The polymer composition of claim 1 wherein the alkoxylated (meth)acrylate monomer of formula I has $R_1$=methyl, $R_2$=methyl, $R_3$=H, and n=4 to 9.

9. The polymer composition of claim 1 comprising from 30 to 50 percent of the alkoxylated (meth)acrylate monomer of formula I.

10. The polymer composition of claim 1 comprising, as polymerized units:
(a) 10 to 30 percent, based on the weight of the polymer, of acrylic acid;
(b) 40 to 60 percent, based on the weight of the polymer, of butyl acrylate; and
(c) 30 to 50 percent, based on the weight of the polymer, of an alkoxylated (meth)acrylate monomer having formula I wherein: $R_1$ and $R_2$ are $CH_3$; $R_3$ is H; and n is from 4 to 9.

* * * * *